(No Model.)

M. FARLEY.
BEVEL SQUARE.

No. 285,601. Patented Sept. 25, 1883.

WITNESSES.
Richard Martin Jr.
Frank W. Fenton

INVENTOR.
Michael Farley
by his attorney
D. P. Kennedy

UNITED STATES PATENT OFFICE.

MICHAEL FARLEY, OF PORTLAND, OREGON, ASSIGNOR OF ONE-HALF TO DAVID P. KENNEDY, OF SAME PLACE.

BEVEL-SQUARE.

SPECIFICATION forming part of Letters Patent No. 285,601, dated September 25, 1883.

Application filed April 7, 1882. (No model.)

*To all whom it may concern:*

Be it known that I, MICHAEL FARLEY, a resident of the city of Portland, in the county of Multnomah and State of Oregon, have invented a new and useful Combined Square, Double Bevel, Miter, Level, Plumb, and Rule, of which the following is a specification.

Heretofore squares of this description have been constructed in detachable portions, and the changes necessary in adjusting the respective portions for any desired function of the square are rendered tedious and inaccurate by the complicated series of manipulations required.

To obviate these difficulties is the object of my invention, which I accomplish by constructing a square in the form of a right-angled triangle, all in one piece, and attaching to the same a spirit-level of suitable size.

This invention can be used either as an ordinary try or carpenter's square, a double bevel, miter, level, plumb, or rule, being intended for general use in the workshop, farm, or home, by mechanics and others.

Figure 1:
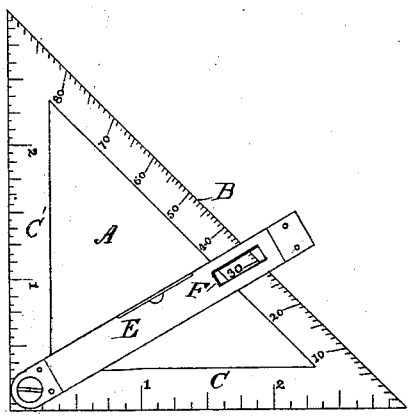
Figure 4:
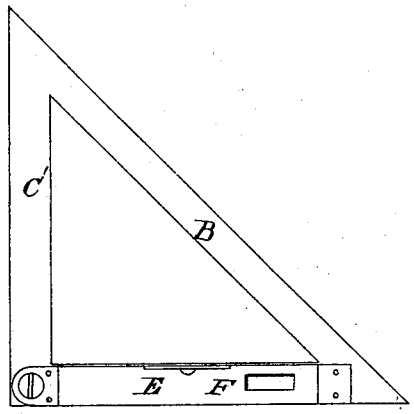
Figure 3:
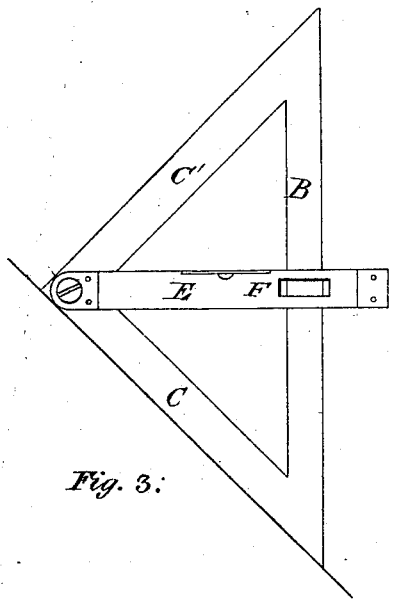
Figure 2:
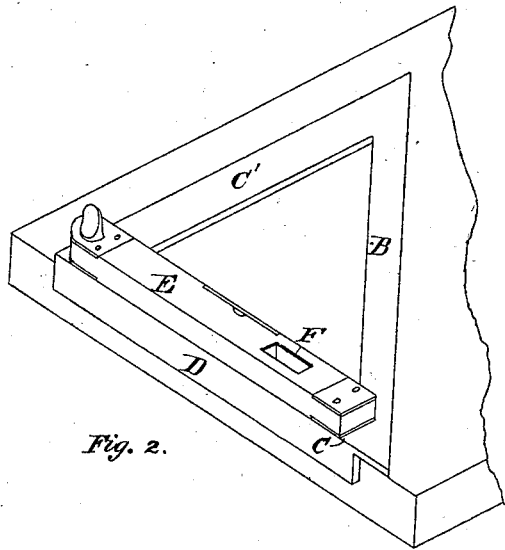

In the accompanying drawings, forming part of this specification, Figure 1 represents my invention in the form of a right-angled triangle. Fig. 2 represents my invention when in use as a common square, miter, and rule. Fig. 3 represents my invention when in use as a double bevel or pitch-board, and Fig. 4 represents my invention when in use as a plumb or level.

A in Fig. 1 represents the triangle, forming a right angle at the intersection of sides C and C′, and two angles of forty-five degrees each at the intersections of hypotenuse B with sides C and C′, respectively. These three sides comprise the square A.

D is a flange or lip formed on side C, extending to the inner line of hypotenuse B. This flange D fits against the outside or surface of the board or other object to be squared. Hypotenuse B has marked upon its upper surface a graduated scale of degrees of a circle, and is adapted to correspond with the adjustments of spirit-level E.

F is an opening in the arm of spirit-level E, for the purpose of reading the degrees on hypotenuse B.

Side C has marked upon its surface a graduated scale of measurement from one inch to one-eighth of an inch, and side C′ has a similar graduated scale from an inch to one-sixteenth of an inch.

The level E is attached to the square at the intersection of sides C C′, by being pivoted upon a bolt, and a heavy thumb-nut and washer hold the level in position. The bolt is threaded above the level to receive the thumb-nut.

The operation of my invention is the following: When used as a square, miter, or rule, no use of the spirit-level will be required, and the square will be in the position shown in Fig. 2 of drawings. When used as a double bevel or pitch-board, then the square will be placed upon a board laid up at the desired pitch, when, by adjusting the spirit-level along the graduated surface of hypotenuse B until the level is obtained, the set-screw is fastened and the spirit-level held in position, showing the degree of pitch, and the instrument itself will give the proper angle at which to cut the top and bottom of each rafter, one side being the top angle and the other side the bottom angle. For this particular function—viz., cutting rafters—my invention will be found very convenient, accurate, and simple in adjustment. When my invention is used as a plumb or level, then the spirit-level E will be adjusted along the side C, in which position it acts both as a plumb or level, angle C′ being placed against the surface to be plumbed, as shown in Fig. 4.

Having described my invention, what I claim as new, and desire to secure by Letters Patent, is—

1. As a new article of manufacture, a right-angled triangle provided with a downward-projecting flange on one of the shorter sides, for the purpose of adjusting the instrument, and a graduated scale on each side, constructed all in one piece, operating as shown, and for the purpose set forth.

2. The right-angled triangle having a flange on one of its shorter sides, for the purpose of adjusting the instrument, and a graduated scale on each of its sides, in combination with a spirit-level pivoted at the apex of the right angle, and a thumb-nut, operating substantially as shown, and for the purpose set forth.

MICHAEL FARLEY.

Witnesses:
 FRANK W. FENTON,
 P. J. BENTGEN.